United States Patent [19]

Hayashi

[11] Patent Number: 5,148,431
[45] Date of Patent: Sep. 15, 1992

[54] SPEECH SIGNAL DECODING APPARATUS WITH ERROR DETECTION AND CORRECTION

[75] Inventor: Ryoji Hayashi, Hyogo, Japan

[73] Assignee: Mitsubishi Denki Kabushiki Kaisha, Tokyo, Japan

[21] Appl. No.: 477,369

[22] Filed: Feb. 9, 1990

[30] Foreign Application Priority Data

May 15, 1989 [JP] Japan .................... 1-118637

[51] Int. Cl.⁵ .................................. G06F 11/00
[52] U.S. Cl. .................... 371/5.1; 371/5.5; 371/30; 371/5.4
[58] Field of Search ............ 371/5.1, 5.5, 30, 5.4, 371/37.1, 37.9

[56] References Cited

U.S. PATENT DOCUMENTS

| | | | |
|---|---|---|---|
| 3,643,027 | 2/1972 | Goldberg | 371/5.1 |
| 3,733,583 | 5/1973 | Merlo | 371/5.4 |
| 4,259,663 | 3/1981 | Gable | 371/71 |
| 4,375,102 | 2/1983 | Van Daal | 375/94 |
| 4,459,696 | 7/1984 | Kojima | 371/38 |
| 4,541,091 | 9/1985 | Nishida et al. | 371/39 |
| 4,727,547 | 2/1988 | Brandes | 371/38 |
| 4,792,953 | 12/1988 | Pasdera et al. | 371/37 |
| 4,802,171 | 1/1989 | Rasky | 371/43 |
| 4,864,573 | 9/1989 | Horsten | 371/5.1 |
| 4,866,712 | 9/1989 | Chao | 371/5.1 |

OTHER PUBLICATIONS

H. Suda et al., "An Error Control Scheme for Digital Voice Transmission in Land Mobile Radio", Article No. 2351, Synthetic National Convention of the Institute of Electronics and Communication Engineers of Japan, 1986.

Primary Examiner—Jerry Smith
Assistant Examiner—Ly V. Hua
Attorney, Agent, or Firm—Rothwell, Figg, Ernst & Kurz

[57] ABSTRACT

A speech decoder having a muting circuit which mutes the output of decoded speech when either the accumulated number of error-correcting codes corrected or the number of error-detecting codes detected within a received signal frame exceeds the set threshold value. Because that part of the decoded speech which fails to meet a reference level is suppressed, noise is eliminated from the decoded speech.

2 Claims, 3 Drawing Sheets

SPEECH SIGNAL DECODING APPARATUS WITH ERROR DETECTION AND CORRECTION

BACKGROUND OF THE INVENTION

1. Field of the Invention

The present invention relates to a speech codec which decodes an error-corrected signal (frame-structured received signal) in order to output decoded speech.

2. Description of the Prior Art

FIG. 1 is a block diagram showing a prior art speech codec. In the figure, reference numeral 1 is a received signal; numeral 2 is an error-corrected signal output from an error correcting circuit after error correction, indicated later; numeral 3 is decoded speech obtained by decoding the error-corrected signal 2; numeral 41 is the above-mentioned error correcting circuit, and numeral 12 is a speech decoding circuit.

In operation, the error correcting circuit 41 decodes error-correcting codes in the received signal 1 so as to correct or detect any errors that may have occurred during transmission. The circuit 41 then outputs the error-corrected signal 2. The speech decoding circuit 12 decodes the error-corrected signal 2 to output the decoded speech 3.

Constructed as described above, prior art speech codecs have a drawback that, when the number of transmission errors in the received signal 1 exceeds the correcting capacity of error-correcting codes, wrong corrections and uncorrected errors which result cause the decoded speech 3 to contain noise.

SUMMARY OF THE INVENTION

It is therefore the principal object of the present invention to provide a speech codec that eliminates the above-described problem of prior art speech codecs, that is, to remove said noise from the decoded speech.

According to a first aspect of the present invention, there is provided a speech codec in which a correcting and decoding means decodes error-correcting codes in a received frame-structured signal, detects any transmission errors therein, corrects them if they are correctable, and decodes the error-corrected signal to provide a decoded speech. Meanwhile, accumulators are provided to calculate the number of the error-correcting codes corrected in a frame of the received signal as well as the number of error-detecting codes detected therein. These counts are compared with the corresponding threshold values by comparators. The results are used by a muting circuit to mute the decoded speech from the correcting and decoding means as needed.

According to a second aspect of the present invention, there is provided a speech codec in which upon detecting a starting position of a frame by using a frame-synchronizing code in a received signal, a threshold value inserting circuit substitutes a threshold value for the frame-synchronizing code bits in the frame-structured received signal, so that the comparators can extract threshold values to be used therein from the frame of the received signal.

The above and other related objects and features of the invention, as well as the novelty thereof, will clearly appear from the following description and from the accompanying drawings.

DETAILED DESCRIPTION OF THE PREFERRED EMBODIMENTS

Figure 2:
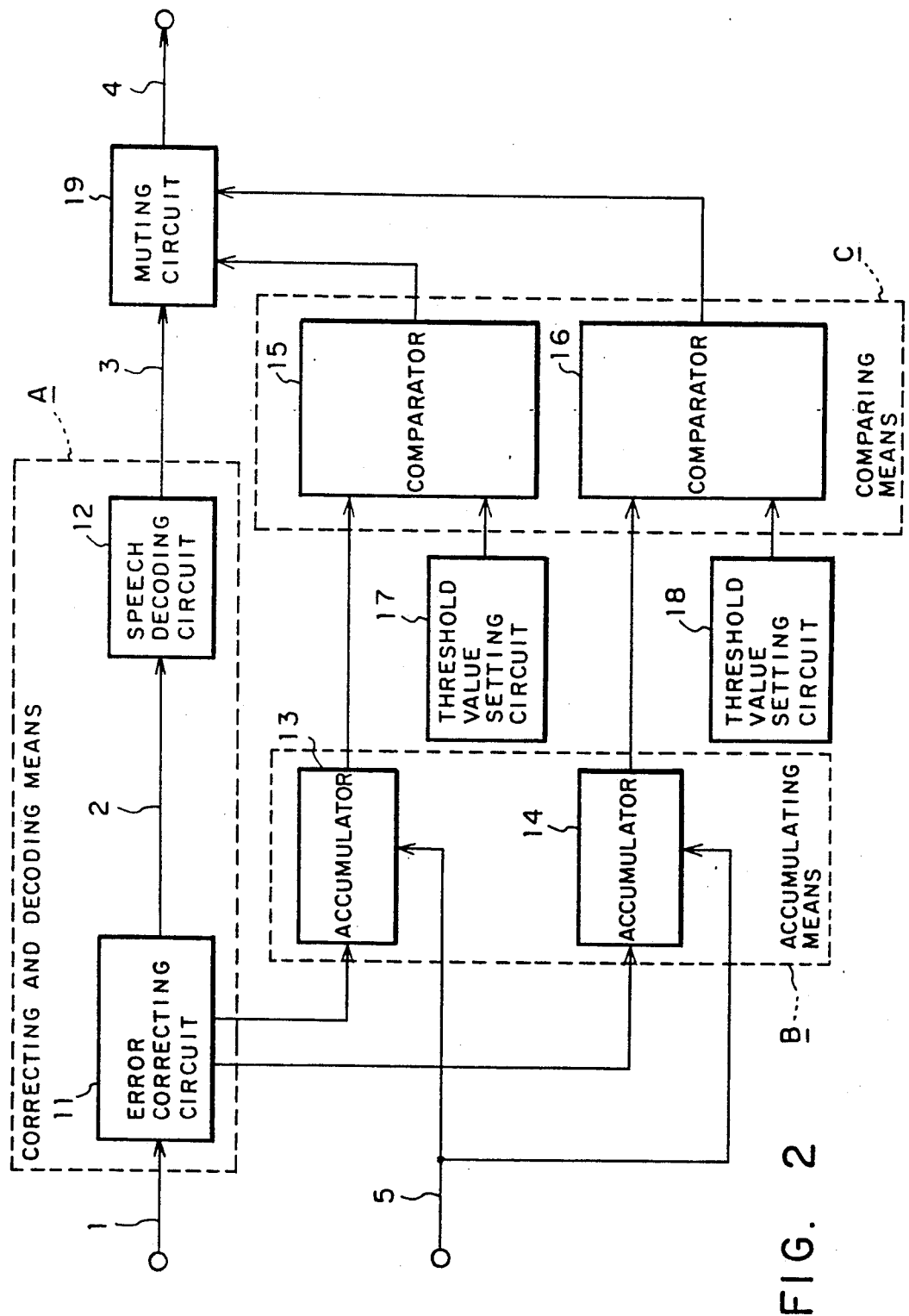
FIG. 2 is a block diagram of a speech codec according to the first aspect of the present invention.

There will now be described preferred embodiments of the present invention by referring to the accompanying drawings. FIG. 2 is a block diagram showing the architecture of a preferred embodiment according to the above-described first aspect of the invention. In the figure, reference numeral 1 is a received signal; numeral 2 is an error-corrected signal; numeral 3 is decoded speech; numeral 4 is speech output; numeral 5 is a frame timing signal that is input for every received signal; numeral 11 is an error correcting circuit; numeral 12 is a speech decoding circuit; numerals 13 and 14 are each an accumulator; numerals 15 and 16 are each a comparator; numerals 17 and 18 are threshold value setting circuits which set threshold values for the number of error-correcting codes corrected and for the number of error-detecting codes detected, respectively, and illustratively made up of switches; numeral 19 is a muting circuit that mutes the decoded speech output from the comparators 15 and 16 as needed; reference character A is a correcting and decoding means; character B is an accumulating means; and character C is a comparing means.

In operation, the error correcting circuit 11 decodes error-correcting codes in the received signal 1 and detects any errors therein. After correcting transmission errors that are detected and found correctable, the circuit 11 outputs the error-corrected signal 2. At this time, the number of the error-correcting codes corrected and the number of the error-detecting codes detected are accumulated respectively by the accumulators 13 and 14 of the accumulating means B. These accumulators, which are reset by the frame timing signal 5, calculate the number of the error-correcting codes corrected and the number of the error-detecting codes detected within the frame of the received signal respectively. The results are compared by the comparators 15 and 16 of the comparing means C with the threshold values set up by the threshold value setting circuits 17 and 18. When the number of the corrected error-correcting codes or of the detected error-detecting codes exceeds the corresponding threshold value, the muting circuit 19 mutes the decoded speech 3 coming from the speech decoding circuit 12. That is, the speech output 4 is inhibited or suppressed.

Figure 3:
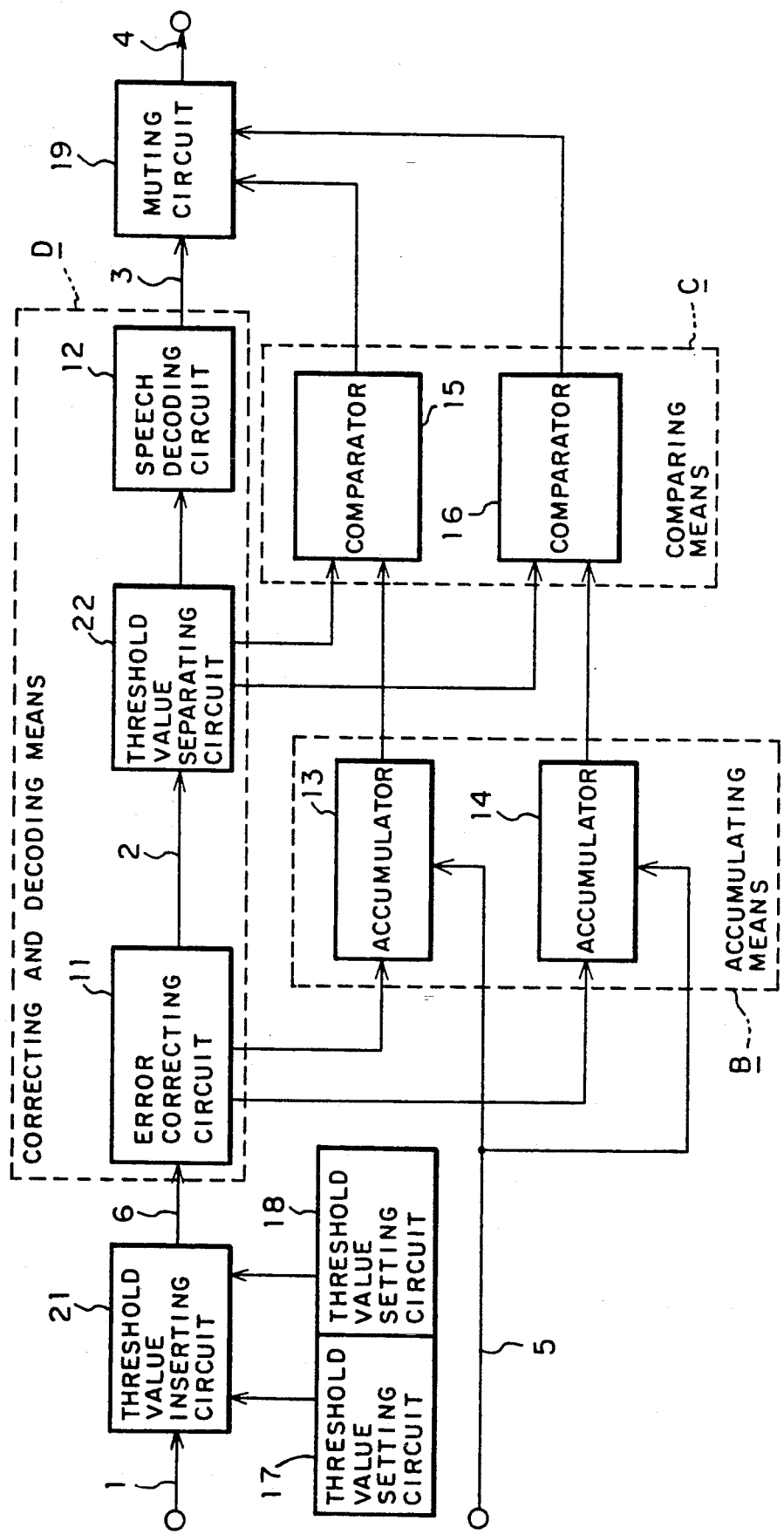
FIG. 3 is a block diagram of a speech codec according to the second aspect of the present invention.

FIG. 3 is a block diagram showing a preferred embodiment according to the above-described second aspect of the invention. In the figure, reference numeral 1 is a received signal; numeral 2 is an error-corrected signal; numeral 3 is decoded speech; numeral 4 is speech output; numeral 5 is a frame timing signal; numeral 6 is a received signal with threshold values inserted therein; numeral 21 is a threshold value inserting circuit which inserts into the received signal 1 the threshold values established by threshold value setting circuits 17A and 18A, as pointed out later; numeral 11 is an error correcting circuit; numeral 22 is a threshold value separating circuit; numeral 12 is a speech decoding circuit; numerals 13 and 14 are accumulators; numerals 15 and 16 are comparators; numerals 17A and 18A are the abovementioned threshold value setting circuits; numeral 19 is a muting circuit; and reference character D is a correcting and decoding means.

In operation, the frame-structured received signal 1 contains frame-synchronizing code bits that indicate the beginning of each frame. By use of the frame-synchronizing code bits, the frame timing signal 5 is extracted from the signal and the beginning of the frame is determined accordingly. Then the frame-synchronizing code bits become unnecessary. At this time, the frame-synchronizing code bits in the received signal are replaced with the threshold values set by the threshold value setting circuits 17A and 18A. The resulting signal is sent to the error correcting circuit 11. The circuit 11 decodes the error correcting codes of the received signal 6 with the threshold values inserted therein, corrects or detects the transmission errors, and outputs the error-corrected signal 2. At this stage, the number of the error-correcting codes corrected and that of the error-detecting codes detected are accumulated by the accumulators 13 and 14 of the accumulating means B respectively. These accumulators, which are reset by the frame timing signal, calculate the number of the error-correcting codes corrected and that of the error-detecting codes detected within the frame respectively. Meanwhile, the threshold value separating circuit 22 separates the inserted threshold values from the error-corrected signal 2. The results are input to the comparators 15 and 16 for comparison with the predetermined threshold values. When either the number of the error-correcting codes corrected or the number of the error-detecting codes detected exceeds the corresponding threshold value, the muting circuit 19 mutes the decoded speech 3 coming from the speech decoding circuit 12. That is, the speech output 4 is inhibited or suppressed.

Figure 1:
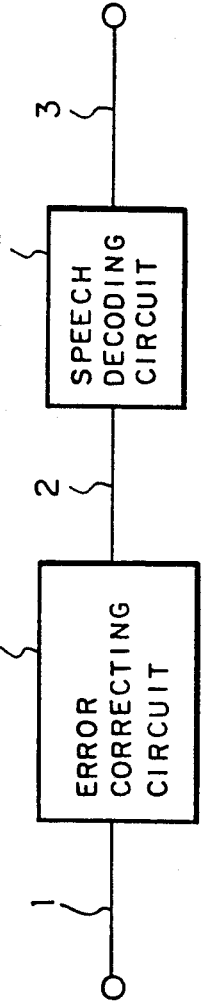
FIG. 1 is a block diagram of a prior art speech codec.
Figure 4:
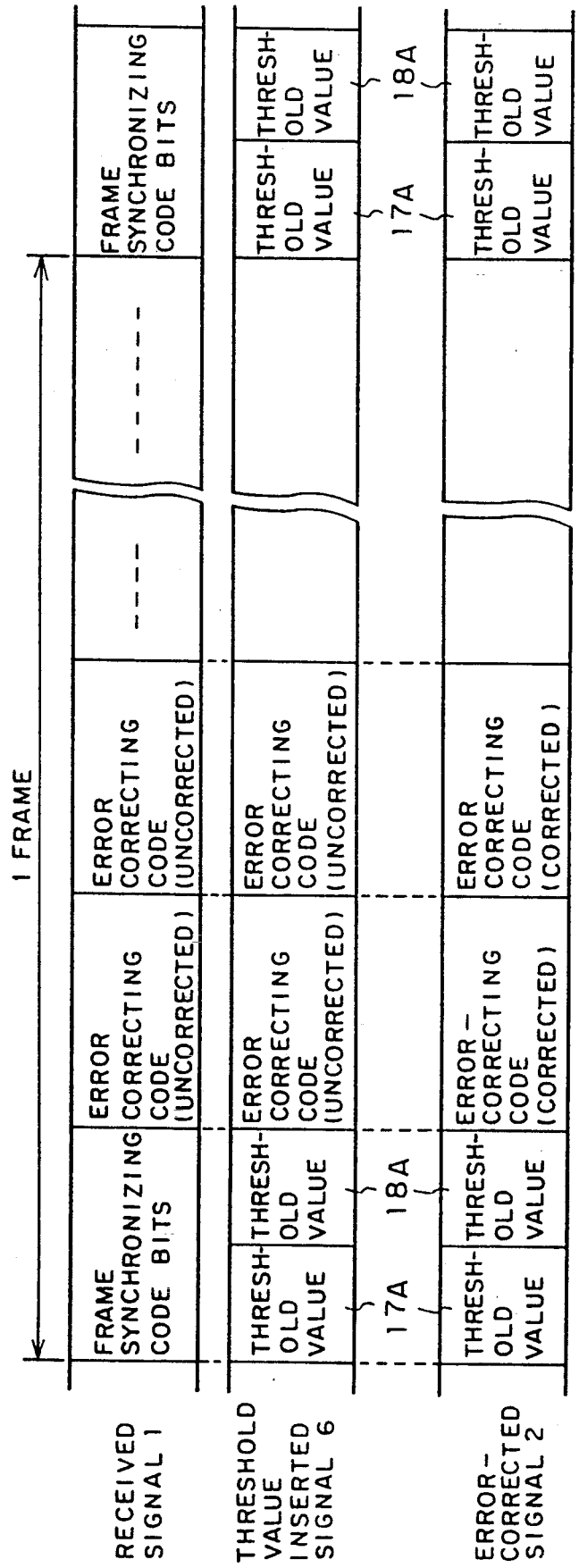
FIG. 4 is a view showing the formats of signals at several points indicated in FIG. 3.

FIG. 4 depicts the relationships among the signal 1 received by the threshold value inserting circuit 21, the received signal 6 with threshold values inserted therein, and the error-corrected signal 2.

As described above, according to the first and the second aspects of the present invention, there is provided a speech codec adapted to mute the decoded speech when the number of the error-correcting codes corrected or the numbers of error-detecting codes detected in each frame exceeds the corresponding threshold value determined in advance. In this manner, the speech codec can eliminate noise from its speech output.

What is claimed is:

1. A speech decoder in which voice data are received in sequential signal frames for decoding comprising:
   a correcting and decoding means for detecting and decoding error-correcting codes and error detecting codes in each sequentially received signal frame and correcting any correctable transmission errors in said received signal frame and for decoding the resulting error-corrected signal into decoded speech;
   an accumulating means connected to said correcting and decoding means for accumulating the number of the error-correcting codes which are corrected by said correcting and decoding means in said received signal frame as well as the number of error-detecting codes detected by said correcting and decoding means in said received signal frame;
   a comparing means connected to receive the output of said accumulating means for comparing each of the accumulated results of said accumulating means with respective threshold values which are set in advance as upper limits; and
   a muting means connected to be activated by said comparing means for muting the entire decoded speech output data of each of said received signal frames in which said accumulated results for such frame exceed said respective threshold values from the decoded speech data which is output by said correcting and decoding means in accordance with each of comparison results of said comparing means.

2. A speech decoder in which voice data are received in sequential signal frames for decoding comprising:
   a threshold value inserting means for inserting threshold values which replace frame-synchronizing code bits in each of said received signal frames, each of said threshold values being set as an upper limit respectively corresponding to a selected number of corrected error-correcting codes for said received signal frame and a selected number of detected error-detecting codes for said signal frame;
   a correcting and decoding means for detecting and decoding the error-correcting codes in said signal frame which are outputted from said threshold value inserting means, for detecting errors in said signal frame, for correcting correctable transmission errors out of said detected errors, sand for decoding said error-corrected signal frame into a decoded speech;
   an accumulating means connecting to said correcting and decoding means for accumulating the number of the error-correcting codes corrected by said correcting and decoding means in said signal frames, as well as the number of the error-detecting codes detected by said correcting means in said signal frame;
   threshold value separating means for separating said inserted threshold values;
   a comparing means connected to receive the outputs of said accumulating means and said threshold value separating means for comparing each of the accumulated results of said accumulating means with the respective separated threshold values previously inserted into the signal frame by said threshold value inserting means; and
   a muting means connected to be activated by said comparing means for muting the entire decoded speech data of each of said received signal frames in which said accumulated results for such frame exceed said respective threshold values from the decoded speech data which is output by said correcting and decoding means in accordance with each of comparison results of said comparing means.

* * * * *

UNITED STATES PATENT AND TRADEMARK OFFICE
CERTIFICATE OF CORRECTION

PATENT NO. : 5,148,431

DATED : September 15, 1992

INVENTOR(S) : Ryoji Hayashi

It is certified that error appears in the above-identified patent and that said Letters Patent is hereby corrected as shown below:

Column 4, line 36, "sand" should be --and--;

line 39, "connecting" should be --connected--.

Signed and Sealed this

Fifth Day of October, 1993

Attest:

BRUCE LEHMAN

Attesting Officer

Commissioner of Patents and Trademarks